United States Patent [19]

Akiyama

[11] Patent Number: 5,328,243
[45] Date of Patent: Jul. 12, 1994

[54] ARRANGEMENT OF AN UNLOCKING KNOB IN AUTOMATIVE SEAT

[75] Inventor: Masami Akiyama, Akishima, Japan

[73] Assignee: Tachi-S Co. Ltd, Akishima, Japan

[21] Appl. No.: 953,929

[22] Filed: Sep. 29, 1992

[30] Foreign Application Priority Data

Sep. 13, 1991 [JP] Japan ................. 3-82470[U]

[51] Int. Cl.$^5$ .............................................. B60N 2/02
[52] U.S. Cl. ........................ 297/378.12; 292/336.3; 292/227
[58] Field of Search ............... 297/378.12; 292/336.3, 292/227; 16/110 R

[56] References Cited

U.S. PATENT DOCUMENTS

| | | | |
|---|---|---|---|
| 3,028,198 | 4/1962 | Murr | 297/378.12 |
| 3,398,987 | 8/1968 | Lynn et al. | 297/378.12 |
| 3,572,818 | 3/1971 | Lohr | 297/378.12 |
| 4,478,445 | 10/1984 | Shimizu | 292/336.3 |
| 4,561,694 | 12/1985 | Mouri et al. | |
| 4,591,196 | 5/1986 | Kurdia | 292/336.3 |
| 4,606,567 | 8/1986 | Kato et al. | 292/336.3 |
| 4,637,648 | 1/1987 | Okino et al. | 292/227 X |
| 4,684,175 | 8/1987 | Trutter | 292/227 X |
| 4,842,312 | 6/1989 | Iwasaki et al. | 292/336.3 |

FOREIGN PATENT DOCUMENTS 57-481141 3/1982 Japan.
60-171751 11/1985 Japan.

*Primary Examiner*—Peter M. Cuomo
*Assistant Examiner*—Jerry Redman
*Attorney, Agent, or Firm*—Oldham, Oldham & Wilson Co

[57] ABSTRACT

An arrangement of an unlocking knob in an automotive seat, wherein a rod is provided, with its one base portion being connected with a lock means in the seat, while its another free end portion is so formed as to define therein a raised portion and a horizontally expanded hook-like latch portion, and wherein the unlocking includes a securing portion which has, formed therein, a recessed groove of a shape generally identical to that of the hook-like latch portion of the rod, such that the free end portion of rod is inserted into and latchingly secured in the recessed groove of unlocking knob securing protion. The recessed groove includes a sloped upper edge for facilitating the ease with which the free end portion of rod is engaged in the recessed groove.

7 Claims, 3 Drawing Sheets

ARRANGEMENT OF AN UNLOCKING KNOB IN AUTOMATIVE SEAT

BACKGROUND OF INVENTION

1. Field of the Invention

The present invention relates to an unlocking knob in an automotive seat, which is operatively connected with a connecting rod extended from a reclining device or seat back fold-down device provided in the seat, so that operation of the unlocking knob renders those devices released from a locked state, and in particular relates to an arrangement of such unlocking knob in the seat for connection with the connecting rod.

2. Description of Prior Art

There has been a seat fold-down structure wherein, in a seat back, a connecting rod or a wire is extended upwardly along the height-wise direction of the seat back from a reclining device, terminating in an end portion projected on the top of seat back, and an unlocking knob is coupled to that end portion of connecting rod. With this structure, pulling the knob causes unlocking of the reclining device via the connecting rod.

One of the recent conventional structures of this kind is such that an opening is formed in the reverse side of seat back such as to be disposed near the top of the seat back, a connecting rod is extended from a reclining device or the like, passing between the back board and seat back in the upward direction and projecting its threaded end portion through the opening, and an unlocking knob is threadedly engaged to that threaded end portion of connecting rod. Typically, the unlocking knob is formed in a cylindrical shape which is long in its axial direction, and further the area of seat back at the opening is recessed in a circular shape relatively larger in diameter than the circular cross-section of the unlocking knob. Hence, the lower portion of knob is inserted in such circular recessed portion of seat back and threadedly engaged with the treaded end portion of connecting rod therewithin.

However, this prior-art unlocking knob projects on the top of seat back, which is objectionable on the whole aesthetic appearance of seat. Additionally, the insertion of the knob in the recessed portion of seat back makes rather difficult to determine the position of the knob for precise engagement with the threaded end portion of connecting rod during the practical assemblage of the seat.

SUMMARY OF THE INVENTION

In view of the above-stated drawbacks, it is therefore a purpose of the present invention to provide an arrangement of an unlocking knob in an automotive seat which permits easier securement of the knob to an end of a rod connected to a lock means in the seat.

In order to achieve such purpose, according to the invention, there is basically provided an arrangement of an unlocking knob in an automotive seat, wherein the seat includes a lock means having a rod operable via the knob to unlock the lock means, wherein a free end portion of the rod is so formed as to define therein a raised portion integrally extended from a base rod portion thereof, and a horizontally expanded hook-like latch portion continuous from the raised portion, wherein the knob includes a securing portion having, formed therein, a recessed groove of a shape generally identical to that of such hook-like latch portion, the recessed groove including a means for defining a sloped upper edge sloped downwardly from an upper plane of the groove to a lower plane of a base bottom portion of the knob, and wherein the foregoing free end portion of rod is latchingly secured into the securing portion of knob, such that the hook-like portion of rod rides on the sloped upper edge defining means and then falls fit in the recessed groove.

Accordingly, the unlocking knob is easily secured to the free end of a rod or connecting rod extending from the lock means in the seat, simply by pushing the knob to the rod free end.

In one aspect of the invention, the unlocking knob may comprise a handle portion, a cover portion, with the foregoing securing portion defined in an opened state between those handle and cover portions, and a lid member which is detatchably fitted over the securing portion. The lid member may be formed with a recessed portion for allowing easy insertion of the free end portion of rod into the securing portion of knob.

In another aspect of the invention, it may be arranged such that a back board attached over the reverse side of a seat back is formed with an opening at the upper end part of back board, that the rod extends upwardly between the seat back and back board along a height-wise direction of seat back, that the foregoing raised portion of rod comprises an upstanding rod section integrally jointed to the base rod section, that the foregoing hook-like latch portion of rod comprises an offset rectilinear rod section extending from the upstanding rod section in parallel with the longitudinal direction of the base rod portion and a horizontal rod latch section extending from the offset rectilinear rod section in a direction generally orthogonal with the longitudinal axis of the base rod portion, that the foregoing recessed groove is of a generally "L" shape for fit receiving therein those offset rectilinear rod section and horizontal rod latch section, that such "L" shaped recessed groove is defined by a vertical partition section and an "L" shaped partition section within the securing portion of the knob, that the "L" shaped partition section includes an arcuate sloped upper edge forming the above-mentioned sloped upper edge defining means, that the thus-formed free end portion of rod projects through the opening of back board, and that the thus-formed unlocking knob is secured in the opening, such that the horizontal rod latch section of rod rides on the arcuate sloped upper edge of the "L" shaped partition section in the knob and then falls fit in a horizontal region of the "L" shaped recessed groove, while the offset rectilinear rod section is received in a vertical region of the "L" shaped recessed groove.

The provision of the lid member may be applied to the above-constructed aspect of invention, and in any case, the opened securing portion of knob, to which is detachably secured the lid member, permits a good view to ascertain that the free end of rod is secured in that securing protion.

DETAILED DESCRIPTION OF PREFERRED EMBODIMENT OF THE INVENTION

Figure 1:
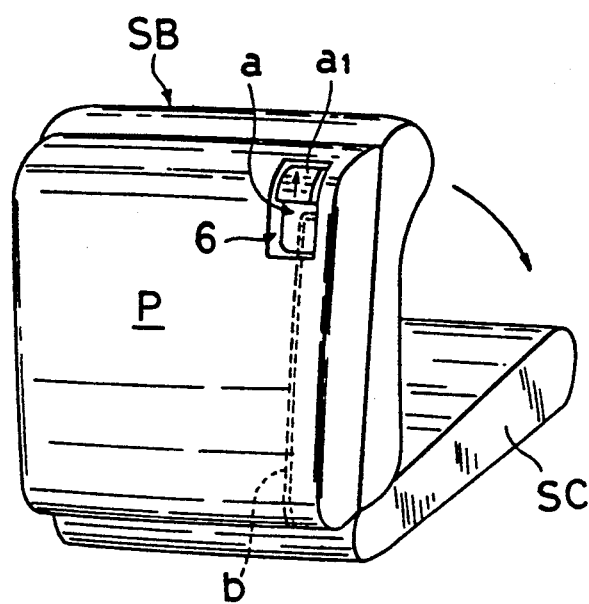
FIG. 1 is a perspective view of an automotive seat having a back board in which an arrangement of unlocking knob in accordance with the present invention is provided.

FIG. 1 shows, in perspective, an automotive seat to which an unlocking knob (a) in accordance wtih the present invention is applied. The seat includes a reclining device or seat back fold-down device (not shown) therein for causing a seat back (SB) to be inclined downwardly or folded down onto a seat cushion (SC). Designation (P) stands for a back board attached on the reverse side of the seat back (SB). When the seat back (SB) is folded down onto the seat cushion (SC), as indicated by the arrow, the back board (P) serves as a load-carrying platform where a baggage or other articles may be placed. The reclining device has a connecting rod (b) extended upwardly between the back board (P) and seat back along the height-wise direction of seat back (SB), as found in the known manner. As will be specified hereinafter, the connecting rod (b) is secured to the unlocking knob (a) in accordance with a special arrangement of the present invention.

Reference is now made to FIGS. 2 through 5, which illustrate one preferred embodiment of the invention.

Figure 2:
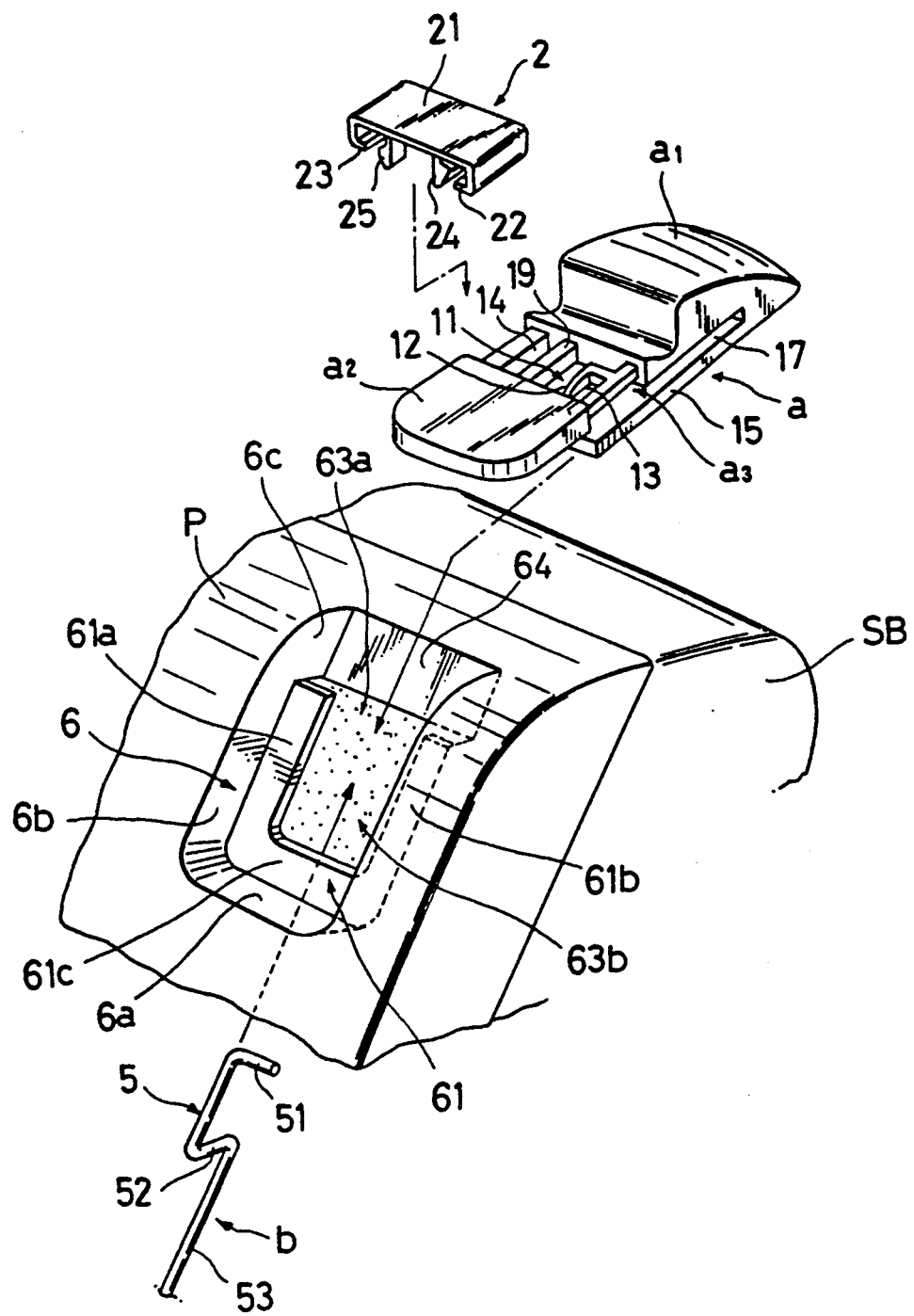
FIG. 2 is a partly broken, exploded perspective view of principal parts of the invention.

As shown in FIG. 2, the unlocking knob (a) is basically comprised of a handle portion (a1), a cover portion (a2) and a securing portion (a3) defined between those handle and cover portions (a1)(a2). On the other hand, the back board (P) is formed at its one upper corner portion (on the right-side upper corner area of back board (P) as viewed from FIG. 2) with a recessed opening (6) which is so formed as to receive the unlocking knob (a) in a slidable fashion.

At first, with regard to the back board (P), the recessed opening (6) is defined at an upper curved area of back board (P) as can be seen from FIG. 2; namely in the neighborhood of the top of seat back (SB). More specifically, the recessed opening (6) has a lower wall (6a), a pair of lateral walls (6b), a pair of upper curved lateral walls (6c) and a flat upper wall (6d), with an opening (64) defined in and circumscribed by those walls. But, a generally U-shaped guide portion (61) is formed in this recessed opening (6), along the lower wall (6a) and both lateral walls (6b) thereof, as shown. Designations (61a), (61b) and (61c) denote a right-side guide section, left-side guide section, and a lower guide section, of the guide portion (61), respectively. Those three guide sections (61a, 61b, 61c) extend horizontally from their respective associated walls (6b, 6b, 6a), in the direction inwardly of the recessed opening (6), with such an arrangement that the foregoing opening is not only defined centrally of the three guide sections, but also defined under the same, which will be understandable from FIGS. 2, 4 and 5.

Now, a description will be made of the unlocking knob (a); namely, its handle portion (a1), portion (a3) and cover portion (a2).

Figure 5:
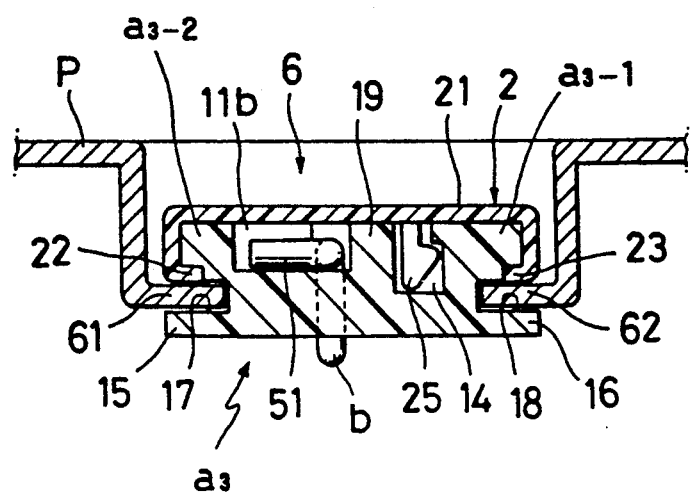
FIG. 5 is a sectional view taken along the line V—V in FIG. 4.

The handle portion (a1) is formed generally in a hook-like shape as shown, having a curved frontal surface formed in a curvature close to that of the upper curved end portion of back board (P), so that an operator can easily manipulate the handle portion (a1) with his or her fingers, and further, the handle portion per se does not project from the back board (P), thus helping to keep the aesthetic appearance of seat. The handle portion (a1) has a flat bottom part (15) and a pair of guide grooves (17)(18), as can be seen in FIGS. 2 and 5. As best shown in FIG. 5, the two guide grooves (17)(18) are each formed at the respective lower lateral sides of the handle portion (a1)and located immediately above such flat bottom part (15). The guide grooves (17)(18) are indicated by FIG. 2 to extend along the flat bottom part (15) and terminate at the boundary between the the securing portion (a3) and the cover portion (a2).

The securing portion (a3) is shown in FIGS. 2, 3, 4 and 5 as having, formed therein, a pair of lateral sections (a3-1)(a3-2), a rectilinear partition section (19), an inverted "L" shaped partition section (12), a first engagement groove (14) defined between the left-side lateral section (a3-2) and rectilinear partition section (19), an inverted "L" shaped securing groove (11) between the rectilinear and inverted "L" shaped partition sections (12)(19), and a second engagement groove (13) defined between the inverted "L" shaped partition section (12) and the right-side lateral section (a3-1).

Figure 4:
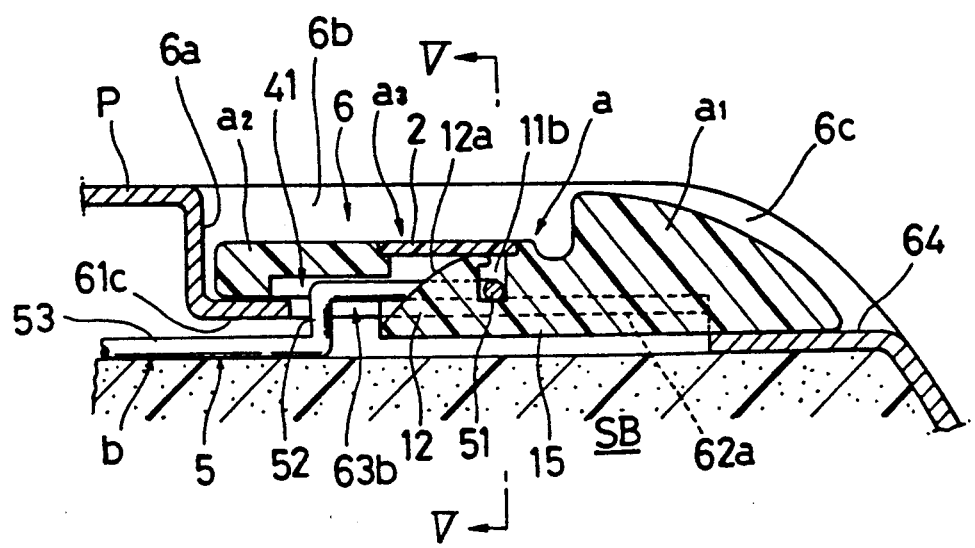
FIG. 4 is a partly broken sectional view of the principal part of the invention.

The first engagement groove (14), as shown in FIG. 4, is formed in a generally "L" shape in section within the securing portion (a3). Although not shown, likewise formed is the second engagement groove (13).

The inverted "L" shaped partition section (12) comprises an arcuate sloped vertical part (12a) and a horizontal part (12b). With particular reference to FIGS. 2 and 4, the arcuate sloped vertical part (12a) is depicted as having an arcuate upper edge sloped from the even upper edge of the horizontal part (12b) down to the free forward end of the foregoing bottom part (15) of handle portion (a1).

Figure 3:
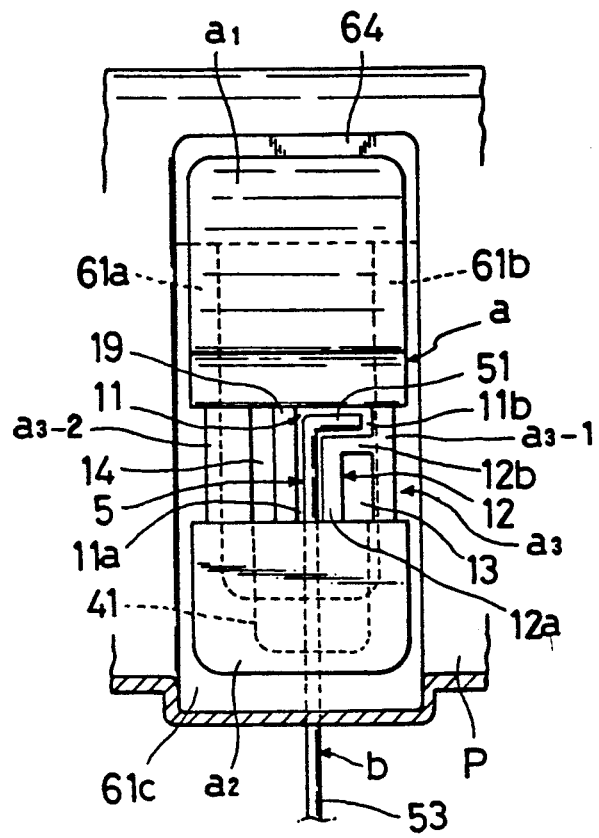
FIG. 3 is a partly broken plan view of the principal part of the invention.

Since the horizontal part (12b) of inverted "L" shaped partition section (12) is integrally jointed to the inner side wall of the left-side lateral section (a3-1), as viewed from FIG. 3, it is seen that the second engagement groove (13) is surrounded with the inverted "L" shaped partition section (12), and that the rectilinear partition section (19) and arcuate sloped vertical part (12a) defines therebetween the vertical region (11a) of the foregoing inverted "L" shaped securing groove (11), whereas between the the horizontal part (12b) and the upstanding base end wall of the handle portion (a1), is defined the horizontal region (11b) of that securing groove (11).

It should be noted here that, excepting the arcuate sloped vertical part (12a), all the abovementioned elements (a3-1, a3-2, 19, and 12b) are equal to one another in height, thus presenting their upper edge surfaces at an even height on the same plane. Therefore, only the arcuate sloped vertical part (12a), as best shown in FIG. 4, has its upper edge sloped downardly in an arcuate way from such even upper edges of other elements, towards the free forward end of handle portion bottom part (15) which is to be situated at a relatively lower level than that of the previously stated lower section (61a) of U-shaped guide portion (61), as will be explained later.

Designation (2) represents a lid member which is detachably secured over the aforementioned securing portion (a3) of the knob (a). The lid member (2) forms a part of the knob (a), and comprises a main cover body (21), a pair of lateral inwardly turned engagement lugs (22) which are each formed on the opposite sides of the main cover body (21), and a pair of spaced-apart securing pawls (24)(25) which is integrally dependent from the reverse surface of the main cover body (21). The main cover body (21) of the lid member (2) is generally equal in size to the securing portion (a3) of the knob (a). The two securing pawls (24)(25) are spaced apart from each other at a distance substantially corresponding to that between the first and second engagement grooves (14)(13), and further formed such as to be fit engageable into the respective those two grooves (14)(13).

From FIG. 5 in conjunction with FIG. 2, it is observed that each of the lateral sections (a3-1)(a3-2) of securing portion (a3) has, formed beneath its side edge portions, a stepped area into which the mating inwardly turned lug (22 or 23) is to be fit received, as will be explained later, the stepped area being thus disposed above the guide groove (17 or 18) and smaller in depth than the latter.

Turning now to the recessed opening (6) formed in the back board (P), designations (63a) (63b) are given thereto as in FIG. 2. The designation (63a) denotes an insert opening part of the recessed opening (6), which is defined between a plane of the foregoing upper flat wall (6d) and a plane of the generally U-shaped guide portion (61). As will be explained later into such insert opening part (63a), is to be inserted the bottom part (15) of unlocking knob handle portion (a1). The designation (63b) denotes an access opening part of the recessed opening (6), which is defined inwardly of the generally U-shaped guide portion (61); namely, which is surrounded with the right-side, left-side and lower guide sections (61a, 61b, 61c) of that particular guide portion (61). As will also be explained later, through such access opening part (63b), the upper free end part of the connecting rod (b) is to be accessed and engaged into the aforementioned unlocking knob securing portion (a3).

With regard to the connecting rod (b), FIG. 2 shows that its upper free end part is formed by a rectilinear rod body section (53), an upstanding rod section (52) extending vertically from the longitudinal axis of the rod body section (53), an offset rectilinear rod section (5) extending from the upper end of such upstanding rod section (52) in parallel with the longitudinal direction of the rod body section (53), and a horizontal rod latch section (51) extending from the end of offset rod section (5) in a direction orthogonal with the longitudinal axis of the rod body section (53). The thus-formed rod (b) is formed as a wire made of a metallic material, but having elastic properties.

Now, a description will be made of how the above-described unlocking knob arrangement has to be assembled in the seat.

First of all, prior to the back board (P) being attached over the back side of seat back (SB), the connecting rod (b), which is extended upwardly from a reclining device or other seat adjusting devices (not shown) along the back surface of seat back (SB), should be positioned such as to place its upper end part (52, 5, 51) in the recessed opening (6) of back board (P). Namely, as indicated by the arrow in FIG. 2, that upper end part (52, 5, 51) of rod (b) should be situated within the access opening part (63b) of recessed opening (6). After then, the back board (P) is attached over the back side of seat back (SB). At this point, as can be seen from FIG. 4, the upper end part of rod (b) projects through the access opening part (63b) and is located slightly above the plane of the U-shaped guide portion (i.e. 61, but at 61a, 61c in this figure).

Then, as indicated by the arrow in FIG. 2, the unlocking knob (a) is slidingly inserted into the recessed opening (6) of back board (P). Stated more specifically in this respect, at first, the cover portion (a2) is abutted upon the lower guide section (61c), while the introductory parts of the aforestated two guide grooves (17)(18) is being slidingly engaged with the respective mating guide sections (61a) (61b) (see FIG. 4). Then, as the knob (a) is moved further downwardly along those guide elments (17, 18, 61a, 61b) within the recessed opening (6), the horizontal latch rod section (51) of the connecting rod (b) rides upon the arcuate sloped vertical part (12a) of the unlocking knob securing portion (a3) and falls down into the horizontal region (11b) of the inverted "L" shaped securing groove (11). Thus, as shown in FIGS. 3 an 4, both offset rectilinear rod section (5) and horizontal latch rod section (51), which generally represent an inverted "L" shaped configuration, are fit received in the inverted "L" shaped securing groove (11), which achieves a securement of the connecting rod (b) to the unlocking knob (a) though the recessed opening (6) of back board (P). In this connection, as seen from FIGS. 3 and 4, the cover portion (a2) of knob (a) is formed at its reverse side with an inner recessed area (41), and the recessed area (41) cooperates with the access opening part (63b) of recessed opening (6) to define a spacing which facilitates easy insert of the upper end part (51, 5) of the connecting rod (b) into the securing portion (a3) of unlocking knob (a) as mentioned above.

Next, the lid member (2) is fitted over the securing portion (a3) of the knob (a) as indicated by the arrow in FIG. 2, such that both securing pawls (24)(25) of the lid member (2) are fit engaged into the respective first and second engagement grooves (14)(13) formed in the knob securing portion (a3) and at the same time both inwardly turned lugs (22)(23) are engaged over the respective stepped areas (not clearly shown, but see FIG. 5) defined at both lateral sides of the knob securing portion (a3). In this way, the lid member (2), which lies flush with the upper surface of the knob cover portion (a2), covers the objectionable inside of the securing portion (a3) so as to finish a smooth whole appearance of the unlocking knob (3) as in FIG. 1.

In accordance with the present invention, as constructed above, the unlocking knob (a) is simply pushed toward and engaged with the exposed upper end part of the connecting rod (b), by only sliding down the knob (a) into the recessed opening (6) of back board, without aid of special jigs and separate elements. Further, the opened securing portion (a3) of knob (a), to which the lid member (2) is detachably secured, serves advantageously to give a good view thereto, thus allowing for checking to see if the hook-like lactch portion (5, 51) of connecting rod (b) is secured in the recessed groove (11) or not. Additionally, the knob (a) per se may be freely designed in any desired shape and structure, which enables various improvements of the same in design and aesthetic appearance.

Finally, the present invention is not limited to the illustrated embodiment, but may be modified in any other ways, with some required replacements and additions therein, without departing from the scopes of the appended claims.

What is claimed is:

1. An arrangement of an unlocking knob in an automotive seat, adapted to be associated with a lock means and operating through a rod, and said rod is operated via said unlocking knob, wherein a free end portion of said rod is so formed as to define therein a raised portion integrally extended from a base rod portion of said rod, and a horizontally expanded hook-like latch portion continuous from said raised portion, wherein said unlocking knob includes a securing portion which has, formed therein, a recessed groove of a shape generally identical to that of said horizontally expanded hook-like latch portion of said rod, said recessed groove including a means for defining a sloped upper edge sloped downwardly from an upper plane of said groove to a lower plane of a base bottom portion of said unlocking knob, and wherein said free end portion of said rod is latchingly secured into said securing portion of said unlocking knob, such that said horizontally expanded hook-like latch portion of said rod rides on said sloped upper edge defining means and then falls fit in said groove.

2. The arrangement as defined in claim 1, wherein said unlocking knob further includes a handle portion and a cover portion, wherein said securing portion is defined in an opened state between said handle and cover portions, and wherein a lid member is fitted over said securing portion.

3. The arrangement as defined in claim 2, wherein said lid member is so dimensioned as to cover said opened securing portion of said unlocking knob, and further is formed at its inner surface with a pair of spaced-apart securing pawls, while being at its respective both lateral side with a pair of inwardly turned lugs, and wherein said lid member is secured over said securing portion of said unlocking by means of those securing pawls and inwardly turned lugs.

4. The arrangement as defined in claim 2, wherein said lid member is formed with a recessed portion for allowing easy insertion of said free end portion of said rod into said securing portion of said unlocking knob.

5. The arrangement as defined in claim 1, wherein said seat includes a seat back and back board attached over a reverse side of said seat back, said back board being formed at its upper end part with an opening means, wherein said rod has a free end portion which extends upwardly between said seat back and back board along a height-wise direction of said seat back, wherein said raised portion of said rod comprises an upstanding rod section whose lower end is integrally jointed to an end of said base rod portion of said rod, wherein said horizontally expanded hook-like latch portion of said rod comprises an offset rectilinear rod section extending from an upper end of said upstanding rod section in parallel with a longitudinal direction of said base rod portion, and a horizontal rod latch section extending from an end of said offset rectilinear rod section in a direction genereally orthogonal with a longitudinal axis of said base rod portion of said rod, wherein said recessed groove is of a generally "L" shape for fit receiving therein said offset rectilinear rod section and horizontal rod latch section associated with said rod, wherein said generally "L" shaped recessed groove is defined by a vertical partition section and an "L" shaped partition section, within said securing portion of said unlocking knob, wherein said "L" shaped partition section includes an arcuate sloped upper edge forming said sloped upper edge defining means, wherein the free end portion of said rod projects through said opening means of said back board, and wherein the unlocking knob is secured in said opening means, such that said horizontal rod latch section of said rod rides on said arcuate sloped upper edge of said "L" shaped partition section in said knob and then falls fit in a horizontal region of said "L" shaped recessed groove, while said offset rectilinear rod section of said rod is received in a vertical region of said "L" shaped recessed groove.

6. The arrangement as defined in claim 5, wherein said unlocking knob further includes a handle portion and a cover portion, wherein said securing portion is defined in an opened state between said handle and cover portions, wherein there is provided a lid member which is so dimensioned as to cover said opened securing portion of said unlocking knob, and further is formed at its inner surface with a pair of spaced-apart securing pawls, while being at its respective both lateral side with a pair of inwardly turned lugs, wherein, in said securing portion of said unlocking knob, there are formed a first engagement groove and a second engagement groove, such that said first engagement groove is defined between one lateral section of said unlocking knob securing portion and said vertical partition section thereof, whereas said second engagement groove is defined between another lateral section of the same securing portion and said "L" shaped partition section thereof, wherein both lateral sides of said knob are each formed with a guide groove, wherein said opening means of said back board has a guide portion formed therein, and wherein said unlocking knob is secured in said opening means by way of engaging slidingly said guide groove of said knob with said guide portion of said opening means, during which said horizontal rod latch section of said rod rides on said arcuate sloped upper edge of said "L" shaped partition section and then falls fit in said horizontal region of said "L" shaped recessed groove, while said offset rectilinear rod section of said rod is received in said vertical region of said "L" shaped recessed groove, and thereafter, said lid member is secured over said opened securing portion of said knob by way of engaging said pair of securing pawls into the respective said first and second engagement grooves and engaging said pair of inwardly turned lugs over the respective said both lateral sides of said knob.

7. The arrangement as defined in claim 5, wherein said lid member is formed with recessed portion for allowing easy insertion of said free end portion of said rod into said securing portion of said unlocking konb.

* * * * *